(12) United States Patent
Rinne et al.

(10) Patent No.: US 9,282,461 B2
(45) Date of Patent: Mar. 8, 2016

(54) APPARATUS, METHODS, AND COMPUTER PROGRAM PRODUCTS PROVIDING IMPROVED FLEXIBLE RESOURCE USAGE

(75) Inventors: Mika P. Rinne, Espoo (FI); Seppo Vesterinen, Oulunsalo (FI); Jyri K. Hamalainen, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 224 days.

(21) Appl. No.: 12/322,040

(22) Filed: Jan. 27, 2009

(65) Prior Publication Data

US 2009/0232066 A1    Sep. 17, 2009

Related U.S. Application Data

(60) Provisional application No. 61/062,762, filed on Jan. 28, 2008.

(51) Int. Cl.
*H04W 72/04* (2009.01)
*H04W 16/14* (2009.01)

(52) U.S. Cl.
CPC ................................... *H04W 16/14* (2013.01)

(58) Field of Classification Search
CPC ..... H04W 16/14; H04W 88/06; H04W 48/08; H04W 26/16
See application file for complete search history.

(56) References Cited

U.S. PATENT DOCUMENTS

| | | | | |
|---|---|---|---|---|
| 5,428,668 | A * | 6/1995 | Dent et al. ................ | 455/452.1 |
| 6,178,450 | B1 * | 1/2001 | Ogishi et al. ............... | 709/224 |
| 7,017,042 | B1 * | 3/2006 | Ziai et al. .................. | 713/161 |
| 7,894,821 | B2 | 2/2011 | Bai et al. | |
| 8,191,116 | B1 * | 5/2012 | Gazzard ...................... | 726/4 |
| 2003/0145122 | A1 * | 7/2003 | Banerjee et al. .......... | 709/250 |
| 2004/0028003 | A1 * | 2/2004 | Diener et al. .............. | 370/319 |
| 2004/0218578 | A1 * | 11/2004 | Fisher ....................... | 370/349 |
| 2005/0239453 | A1 * | 10/2005 | Vikberg et al. .......... | 455/426.1 |
| 2006/0083205 | A1 * | 4/2006 | Buddhikot et al. ....... | 370/338 |

(Continued)

FOREIGN PATENT DOCUMENTS

| | | | | |
|---|---|---|---|---|
| CN | 101083825 A | | 12/2007 | |
| EP | 1 863 303 A1 * | | 5/2007 | ............ H04Q 7/36 |

(Continued)

OTHER PUBLICATIONS

IST-2003-507581 Winner D6.1' Winner Spectrum Aspects: Methods for Efficient Sharing, Flexible Spectrum Use and Coexistence, Oct. 30, 2004, 88 pgs.*

(Continued)

*Primary Examiner* — Joseph Bednash
(74) *Attorney, Agent, or Firm* — Harrington & Smith

(57) ABSTRACT

In one exemplary embodiment of the invention, an apparatus includes: a transmitter configured to send an advertisement message having communication information for an access point; and a receiver configured to receive a flexible use message indicative of how the access point may utilize at least a portion of a shared communication resource. In another exemplary embodiment of the invention, an apparatus includes: a receiver configured to receive an advertisement message having communication information for an access point; and a transmitter configured to transmit to the access point a flexible use message indicative of how the access point may utilize at least a portion of a shared communication resource.

20 Claims, 6 Drawing Sheets

(56) References Cited

U.S. PATENT DOCUMENTS

2006/0109800 A1* 5/2006 Vaillant et al. .............. 370/254
2006/0221913 A1* 10/2006 Hermel et al. .............. 370/338
2006/0223515 A1* 10/2006 Hermel et al. .............. 455/418

FOREIGN PATENT DOCUMENTS

| EP | 1 863 303 A1 | 12/2007 |
| RU | 2301498 C2 | 6/2007 |

OTHER PUBLICATIONS

IEEE Std 802.11-1997, 1997, IEEE, entire document.*
Dierks et al. The TLS Protocol Version 1.0, IETF RFC 2246, Jan. 1999.*
IST-2003-507581 Winner D6.1: Winner Spectrum Aspects: Methods for Efficient Sharing, Flexible Spectrum Use and Coexistence, Oct. 30, 2004, 88 pgs.

* cited by examiner

APPARATUS, METHODS, AND COMPUTER PROGRAM PRODUCTS PROVIDING IMPROVED FLEXIBLE RESOURCE USAGE

CROSS-REFERENCE TO RELATED APPLICATIONS

This patent application claims priority under 35 U.S.C. §119(e) from U.S. Provisional Patent Application No. 60/062,762, filed Jan. 28, 2008, the disclosure of which is incorporated by reference herein in its entirety.

TECHNICAL FIELD

The exemplary and non-limiting embodiments of this invention relate generally to wireless communication systems, apparatus, methods and computer program products and, more specifically, relate to flexible resource usage.

BACKGROUND

The following abbreviations are utilized herein:
AP access point
CSG closed subscriber group
DTX discontinuous transmission
eNB E-UTRAN node B, evolved node B
E-UTRAN evolved universal terrestrial radio access network
FSU flexible spectrum use
IE information element
IMT-2000 international mobile telephony-2000
IMT-A international mobile telephony-advanced
IP internet protocol
IPSec IP security
L2 layer 2 (medium access control, MAC)
LAN local area network
Node B base station
O&M operation and maintenance
PLMN public land mobile network
RF radio frequency
SS spectrum sharing
TCP transmission control protocol
UDP user datagram protocol
UE user equipment, such as a mobile station or mobile terminal
WLAN wireless local area network FSU generally refers to any spatially and/or temporally varying use of radio spectrum/radio resources. As a non-limiting example, FSU enables networks of different operators to operate on a same radio spectrum (using the same shared radio resources). FSU allows a plurality of operators to collectively utilize a frequency band such that there are no dedicated portions licensed to a single operator. The frequency band may still be licensed, however regulatory rules will dictate how bandwidth sharing is executed. This allows each operator to adjust its frequency use according to local needs such that the scarce spectrum is more efficiently utilized than in non-FSU models (e.g., the current regulation model). FSU may also be applied on an unlicensed band, though the flexible spectrum use would still have to be regulated so that the networks can reliably operate.

SS generally refers to situations in which different systems and/or sub-systems utilize the same part of a spectrum in a coordinated or uncoordinated manner. A special case of SS is band-sharing based on FSU. Typically, the sharing systems are based on similar technologies and offer similar services. For example, different operators may share the same spectrum by utilizing dynamic channel assignment from a common pool of channels.

IMT-A refers to radio access systems beyond IMT-2000 having a new, global, unified wireless architecture which: (i) visualize a hierarchy of interconnected access systems; (ii) envision new radio interfaces for mobile classes targeting at data rates of 100 Mbps and nomadic/local-area classes targeting at 1 Gbps; and (iii) include operation on new (i.e., yet to be assigned) spectrums or frequency bands to be licensed. Unlicensed operation will also be in the scope of IMT-A.

Reference with regard to background and general concepts of FSU for IMT-A systems may be made to IST-2003-507581 WINNER D6.1: WINNER Spectrum Aspects: Methods for Efficient Sharing, Flexible Spectrum Use and Coexistence, Oct. 30, 2004.

SUMMARY

The below summary section is intended to be merely exemplary and non-limiting.

In one exemplary embodiment of the invention, a method comprising: sending an advertisement message comprising communication information for an access point; and receiving a flexible use message indicative of how the access point may utilize at least a portion of a shared communication resource.

In another non-limiting, exemplary embodiment, a program storage device readable by a machine, tangibly embodying a program of instructions executable by the machine for performing operations, said operations comprising: sending an advertisement message comprising communication information for an access point; and receiving a flexible use message indicative of how the access point may utilize at least a portion of a shared communication resource.

In another non-limiting, exemplary embodiment, an apparatus comprising: a transmitter configured to send an advertisement message comprising communication information for an access point; and a receiver configured to receive a flexible use message indicative of how the access point may utilize at least a portion of a shared communication resource.

In another non-limiting, exemplary embodiment, an apparatus comprising: means for sending an advertisement message comprising communication information for an access point; and means for receiving a flexible use message indicative of how the access point may utilize at least a portion of a shared communication resource.

In another non-limiting, exemplary embodiment, a method (e.g., a computer-implemented method) comprising: receiving an advertisement message comprising communication information for an access point; and sending to the access point a flexible use message indicative of how the access point may utilize at least a portion of a shared communication resource.

In another non-limiting, exemplary embodiment, a program storage device readable by a machine, tangibly embodying a program of instructions executable by the machine for performing operations, said operations comprising: receiving an advertisement message comprising communication information for an access point; and sending to the access point a flexible use message indicative of how the access point may utilize at least a portion of a shared communication resource.

In another non-limiting, exemplary embodiment, an apparatus comprising: a receiver configured to receive an advertisement message comprising communication information for an access point; and a transmitter configured to transmit to the access point a flexible use message indicative of how the access point may utilize at least a portion of a shared communication resource.

In another non-limiting, exemplary embodiment, an apparatus comprising: means for receiving an advertisement message comprising communication information for an access point; and means for sending to the access point a flexible use message indicative of how the access point may utilize at least a portion of a shared communication resource.

In another non-limiting, exemplary embodiment, a program storage device readable by a machine, tangibly embodying a data structure representative of an advertisement message, wherein the advertisement message comprises communication information for an access point, wherein the advertisement message is configured for use by an operator to specify how the access point may utilize at least a portion of a shared communication resource.

In another non-limiting, exemplary embodiment, a program storage device readable by a machine, tangibly embodying a data structure representative of a flexible use message, wherein the flexible use message is indicative of how an access point may utilize at least a portion of a shared communication resource, wherein the flexible use message is transmitted towards the access point by an operator in response to the operator receiving an advertisement message comprising communication information for the access point.

DETAILED DESCRIPTION

Figure 1:
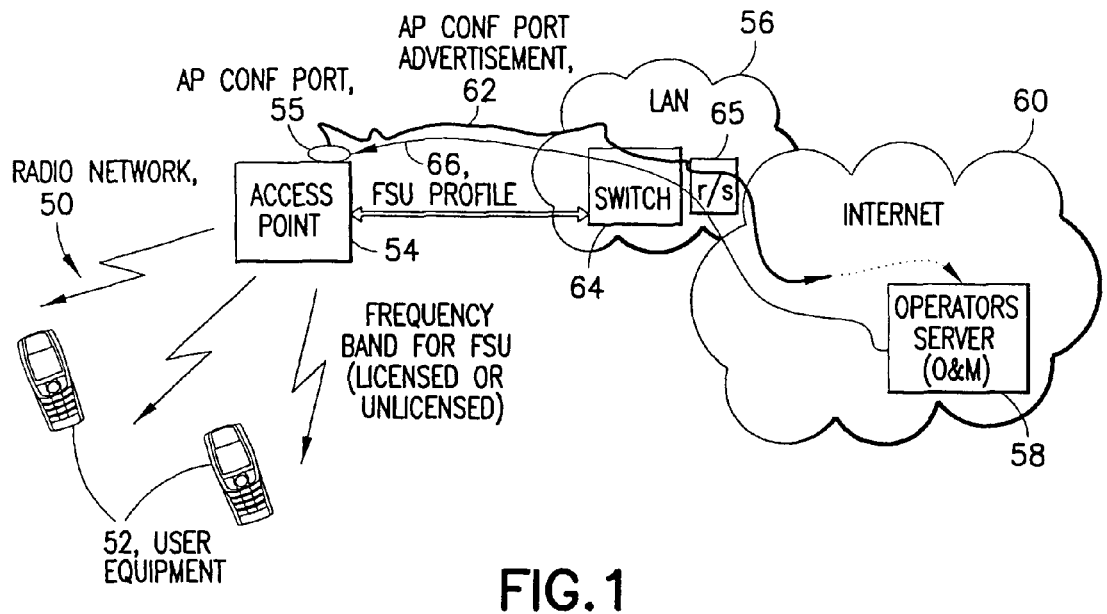
FIG. 1 depicts an exemplary communications network within which the exemplary embodiments of the invention may be practiced.

Some exemplary embodiments of the invention provide for a FSU profile which informs the operator of local area deployments and allows the radio networks to be at least partially coordinated with regard to the bounds of FSU use. For example, if the operator deploys a WLAN, the O&M server can deliver FSU profiles to the WLAN APs according to the Service Level Agreements with the other operators in the area. If there are local area deployments that are not deployed by the operator, the operator will be given the opportunity to set the FSU profiles for the local area APs such that they will reasonably cope (e.g., coordinate) with the wide area deployment of the operator.

In order to deliver the FSU profile to the local AP, the O&M server may first receive a configuration port advertisement from the local AP. The configuration port advertisement generally informs the O&M server that there is a local AP in the region in question. Furthermore, the advertisement may provide communication information enabling the O&M server to communicate with the local AP via a configuration port of the local AP. Typically, the O&M server node has no RF capabilities. As such, and by way of example, the O&M server may communicate with the local AP over IP protocol via one or more LANs (e.g., L2 switched LANs) or one or more IP routed networks. In other exemplary embodiments, the server management node (e.g., the O&M server) may have RF capabilities.

It is generally assumed that the O&M server oversees, controls or otherwise supervises APs or base stations in a region. Furthermore, for the purposes of the below discussion, it is also assumed that there exists a local AP that desires to utilize at least a portion of a shared communication resource, such as a shared spectrum (FSU), for example.

It is briefly noted that there are four possible arrangements with regards to the new local area domain: (i) the AP may be owned by the operator; (ii) the AP may not be owned by the operator; (iii) the AP may be installed by anyone; or (iv) the AP is a component of an irregular, local network layout.

In case of home eNBs as the APs in the operator domain, the AP is accessible by a CSG. In case of an open access AP (e.g., similar to some current WLANs), the AP installer/owner may provide public access. This may also be desirable by the operator in order to increase local access to the services and would thus not necessarily be seen as a competitor's solution. In the operator domain, the local area network may even belong to the operator's global roaming infrastructure, unlike WLAN networks currently operating on unlicensed bands. This provides a competitive advantage for the operator's WLAN as compared to an open access WLAN.

For example, if an AP is going to be operational in any of the IMT-A bands where the FSU is regulated, licensed to an operator or otherwise providing open access to the shared band, exemplary embodiments of this invention propose that the AP opens a configuration port, where it is willing to receive FSU information (e.g., FSU configurations or FSU profiles) from the operator. The AP sends to the IP network an advertisement of its configuration port and receives and implements the FSU information (e.g., FSU profiles) received from the network. Other exemplary embodiments provide for the corresponding networking structure and/or new protocols for the AP configuration port advertisement and/or the FSU information (e.g., the FSU profile). More generally, these two new messages may be considered to belong to a common AP Application Protocol (e.g., see the eNB Application Protocol for reference) defined by the exemplary embodiments of this invention. In the networking technology, both alternatives of connectionless and connection-oriented transport are feasible.

Below, the networking solution is described in section 1, the AP configuration port advertisement is described in section 2, the FSU profile is described in section 5 and the AP Application protocol in section 6. Sections 3 and 4 describe the server operation and the AP operation, respectively. Section 7 gives further examples of the FSU profile. Section 8 considers in further detail various exemplary devices that may be used when implementing the exemplary embodiments of the invention. Section 9 discusses various exemplary embodiments of the invention.

Note that although referred to below as a FSU profile, in other exemplary embodiments the message, data or information in question may be referred to by other terms, such as FSU information, FSU message or FSU configuration. The term "FSU profile" is used herein as a non-limiting designation. Similarly, the AP configuration port advertisement may be referred to by a different designation.

SECTION 1: NETWORKING

FIG. 1 depicts an exemplary communications network 50 within which the exemplary embodiments of the invention may be practiced. The network 50 includes at least one LE 52 connected to an AP 54. The AP 54 is connected to a LAN 56. The LAN 56 is coupled to an operator's O&M server 58 via the Internet 60. The AP 54 sends a configuration port advertisement 62 (e.g., using its configuration port 55) to the network (i.e., the O&M server 58). The advertisement 62 may be sent via zero or more switches 64, and also through zero or more intermediate relays, servers or proxies (r/s) 65. The operator's O&M server 58 receives the configuration port advertisement 62 and sends a FSU profile 66 to the AP 54 (e.g., which may receive the FSU profile 66 via its configuration port 55). The FSU profile 66 defines the bounds of operation in the shared radio spectrum (i.e., the FSU).

Figure 2:
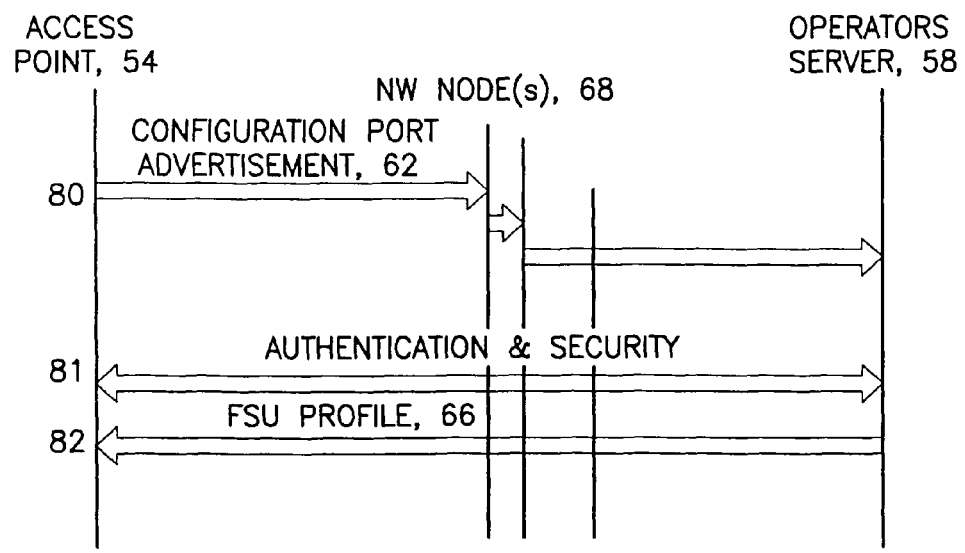
FIG. 2 illustrates an exemplary message sequence chart for the exemplary operations described with respect to FIG. 1.

FIG. 2 illustrates an exemplary message sequence chart for the exemplary operations described above with respect to FIG. 1. At step 80, the AP 54 sends a configuration port advertisement 62 to the operator's server (e.g., the O&M server 58). The advertisement 62 may be transmitted via one or more intermediate nodes (Nw nodes) 68. At step 82, the Operator's O&M server 58 sends a FSU profile 66 (e.g., a message comprising the FSU profile 66) to the AP 54, the FSU profile 66 defining the bounds of operation in the shared radio spectrum. In further exemplary embodiments, authentication and security signaling or operations may take place (step 81), for example, prior to transmission of the FSU profile 66. Depending on the networking technique being utilized, the role of the network nodes may be different than that shown in FIG. 2.

As a non-limiting example, the configuration port advertisement message can be sent to the operator's O&M server unicast address over the IP using the connectionless UDP transport protocol and the AP application protocol port number of the O&M server. The O&M Server can respond over the newly established UDP socket with the AP application protocol message containing the FSU profile. As further non-limiting examples, the connectionless principle over IP/UDP will work within the scope of broadcast or multicast in the network, for example, with the advertisement sent to a broadcast or multicast IP address.

In one non-limiting, exemplary embodiment, the configuration port advertisement message is sent to the operator's O&M server over the IP using the connection-oriented TCP transport protocol and the AP application protocol port number to establish a permanent or semi-permanent management connection.

In some exemplary embodiments, the AP comprises components, software or other means for resolving the IP address of the operator's O&M server. As non-limiting examples, the AP may use a (neighbor) discovery mechanism to find a server host, or the IP address of the operator's O&M server may be pre-configured to the AP. If the AP knows the IP address of the operator's O&M server in advance, both UDP or TCP transport protocols are applicable, as non-limiting examples.

In further non-limiting, exemplary embodiments, the configuration port advertisement is transmitted via a single IP subnet (e.g., a link). This means that only the IP Hosts connected to the same link and the "next hop" Access Router will receive the advertisements. However, in some exemplary embodiments, "the link/IP subnet" may comprise a large Local Area Network or even a Wide Area Network using the L2 switched technology. Such a L2 switched network may comprise a part of one operator's domain, where globally routable IP addresses are reserved from the address space assigned to the operator.

In another non-limiting, exemplary embodiment, the AP sends the configuration port advertisement to the link-local IP address. The scope of the link-local IP address is generally the LAN. This means that a local O&M server may actually reside within the LAN or there may be a relay node inside the LAN, either of which has the intelligence to monitor the APs connected to the LAN and capable of proxying the configuration port advertisement to the actual O&M server. This proxying node must then know the IP address of the operator's O&M server (e.g., but the AP need not know it).

In a further non-limiting, exemplary embodiment, the AP may accurately know the full IP address or host ID of the destination server (e.g., DNS name and URL of the operator domain). This strict requirement can be avoided such that the node does not know the routable destination address accurately, but one must use a well-known address for broadcast or multicast instead in order to resolve/discover the desired unicast IP address. Another alternative is to use a relay agent service.

SECTION 2: AP CONFIGURATION PORT ADVERTISEMENT

Figure 3:
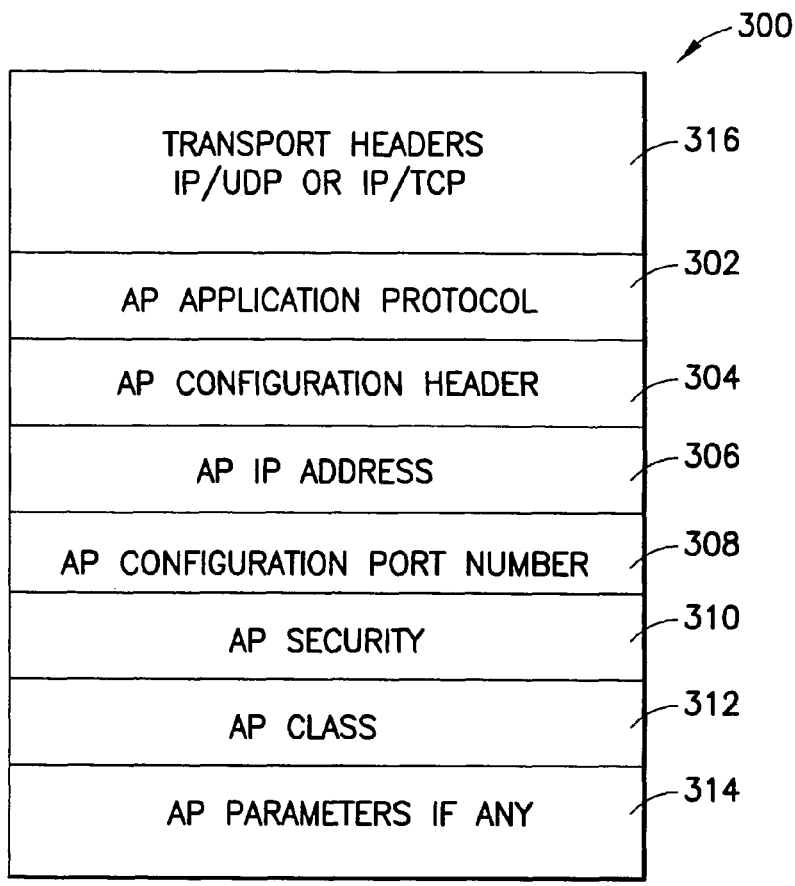
FIG. 3 shows an exemplary configuration port advertisement message encapsulated in the application part of an IP datagram.

FIG. 3 shows an exemplary configuration port advertisement message 300 encapsulated in the application part of an IP datagram. The second through eighth fields comprise new information elements according to various exemplary embodiments of the invention. The exemplary configuration port advertisement message 300 signals configuration/communication information for the configuration port of the AP.

The AP application protocol field 302 identifies the protocol (e.g., protocol type for the message 300). The AP configuration header 304 identifies the message as an AP configuration advertisement message (e.g., message type). The other fields give the IP address of the Access Point (306) and the AP configuration port number (308). The AP security field 310 may define security-related parameters or protocols as needed (if needed). For example, the AP security field 310 may specify if security is being used (e.g., is in place), a type of security in use and provide information to enable authorization and/or registration. The AP class 312 identifies the AP capability class(es) (e.g., the radio bands) on which the AP is capable of operating. Further parameter lists 314 may be used for other, additional purposes such as to define a type of AP, as a non-limiting example. Furthermore, additional fields may be utilized. As one non-limiting example, an additional field may indicate the WLAN network name. Note that the configuration port advertisement message 300 may also include one or more transport headers 316, such as for IP/UDP or IP/TCP, as non-limiting examples.

While depicted in FIG. 3 with eight information elements, the exemplary embodiments of the invention are not limited thereto and may utilize any suitable number and types of elements. The information elements shown in FIG. 3 are merely exemplary. Furthermore, the information elements may utilize any suitable number of bits to convey information.

SECTION 3: SERVER OPERATION

After the O&M server (or any configuration management server) receives the AP configuration port advertisement message, the operator (i.e., the operator managing the O&M server) is able to recognize that there exists a local area deployment which is not directly under its operational control. However, the local area network may at least partly use the shared band with the operator (i.e., FSU).

The operator thus may be allowed to create a FSU profile and send it to the AP (e.g., the configuration port of the AP). The FSU profile may contain parameters and operation bounds for that AP to operate on the shared band. For example, the operator may sense or detect interference in its radio network and, based on mobile reporting, determine that it should change the FSU bounds a given local AP is using. This allows the operator to create an update of the FSU profile for that AP. Naturally, the operator may send the same FSU profile/message as a broadcast message to multiple APs if it desires to control all of them by giving the same bounds (i.e., the same FSU profile).

SECTION 4: AP OPERATION

The AP, if operating in the shared spectrum, receives the FSU profile(s) and satisfies their definitions. If a given AP is not able to satisfy the FSU profile, the operator may, for example, send a FSU profile defining that no operation by this AP is allowed. This will trigger the AP to be non-operational and the owner of that AP may need to switch it (even manually) to another band, for example, to operate on the unlicensed WLAN bands (e.g., at 2.4 GHz).

If the AP is more intelligent or advanced (as non-limiting examples), it may be able to satisfy the FSU profile and find an operational regime according to the bounds given by the operator. In some exemplary embodiments, the FSU profile may contain bounds for different AP capability classes. A simpler AP may satisfy a simpler condition (given by the FSU profile) meaning that it may operate on the band, but due to its limited capabilities may not be able to operate at maximum efficiency or maximum bandwidth available. Another AP, one with higher capabilities, may be able to satisfy the full FSU profile given and may thus find a larger operational regime still satisfying the bounds given by the operator FSU profile. This will lead to a higher local area capacity compared to that of the simpler AP. As a non-limiting example, the different AP classes may be delineated by one or more aspects or qualities, such as protocol, maximum data rate, QoS, and/or one or more link measurements, as non-limiting examples.

SECTION 5: FSU PROFILE

Figure 4:
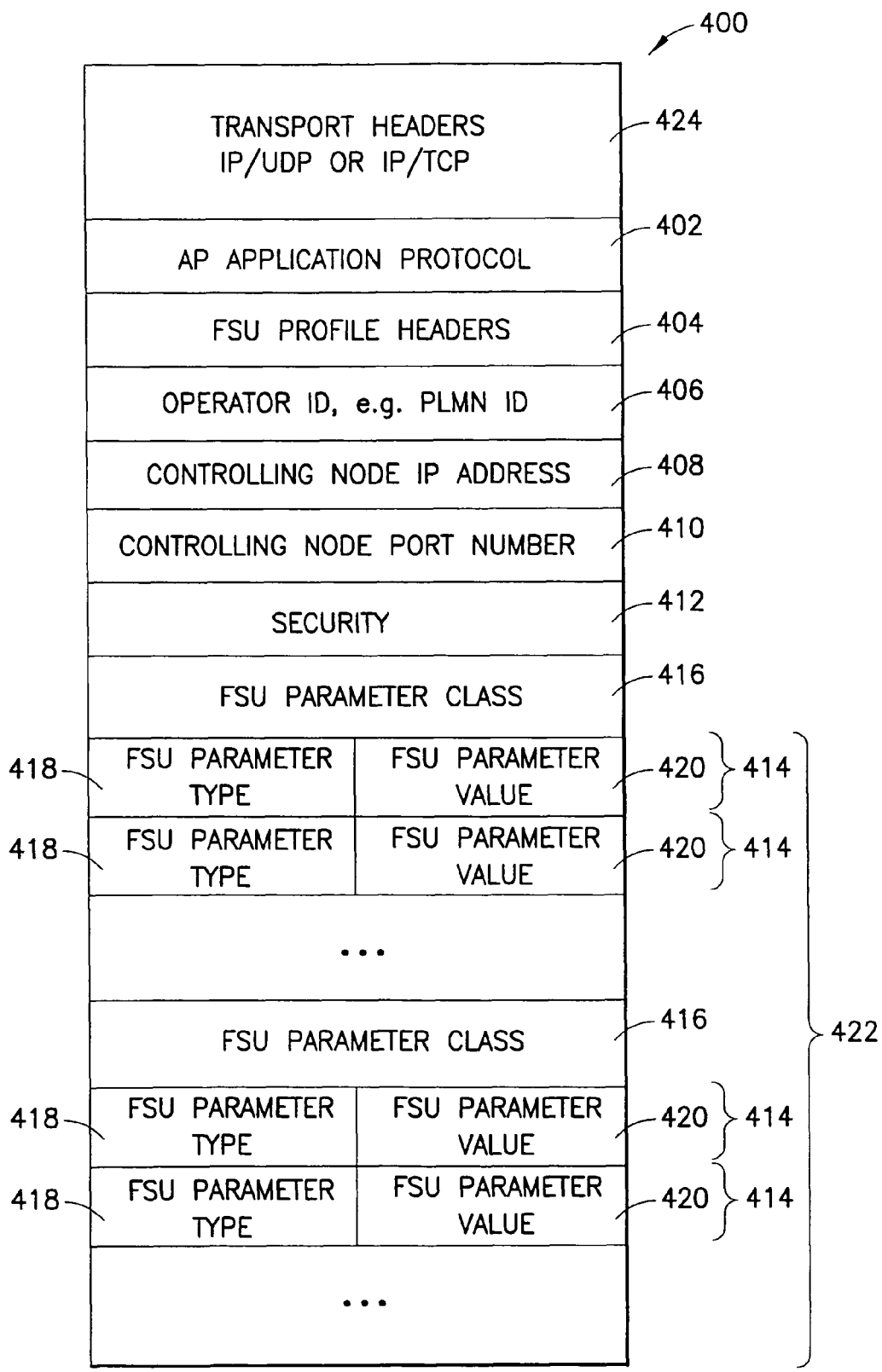
FIG. 4 illustrates an exemplary FSU profile in accordance with the exemplary embodiments of the invention.

FIG. 4 illustrates an exemplary FSU profile 400 in accordance with the exemplary embodiments of the invention. The second through last fields comprise new information elements according to various exemplary embodiments of the invention. The FSU profile 400 signals (e.g., via one or more parameters and/or operation bounds) how a local AP may operate on the shared band (i.e., how the local AP is permitted to use the shared resources).

The AP application protocol field 402 identifies the protocol. The FSU profile header 404 identifies the message (e.g., as a FSU profile). The operator ID 406 identifies the operator who defines the FSU profile (e.g., by the PLMN id). The operator may inform the IP address (controlling node IP address) 408 of the server from where it sources the FSU profiles and that would act as the destination for the AP to send any notifications. The controlling node port number 410 defines the communication port of the O&M server. Additional security features 412 may be present. The FSU parameters 414 and FSU parameter classes 416 form the body (or payload) 422 of the FSU profile 400. The FSU parameters 414 may be categorized (e.g., sorted, arranged, assigned) to parameter classes 416 with each parameter having a type 418 and a value 420. A single parameter class 416 may comprise zero or more parameters 414. For example, a parameter class having zero parameters may indicate a non-enabled parameter class. The FSU parameters 414 may be as elaborate as necessary to describe the FSU operation. Examples of FSU profiles 400 are given below in section 7. Note that the FSU profile 400 may also include one or more transport headers 424, such as for IP/UDP or IP/TCP, as non-limiting examples.

While depicted in FIG. 4 with the information elements shown, the exemplary embodiments of the invention are not limited thereto and may utilize any suitable number and types of elements. The information elements shown in FIG. 4 are merely exemplary. Furthermore, the information elements may utilize any suitable number of bits to convey information.

SECTION 6: AP APPLICATION PROTOCOL

Some exemplary embodiments of the invention provide for an AP application protocol that assists in the communication from and/or to the AP. This protocol is defined at least for the purpose of the AP configuration port advertisement and/or for FSU profile delivery (e.g., delivery, transport or communication thereof).

Figure 5:
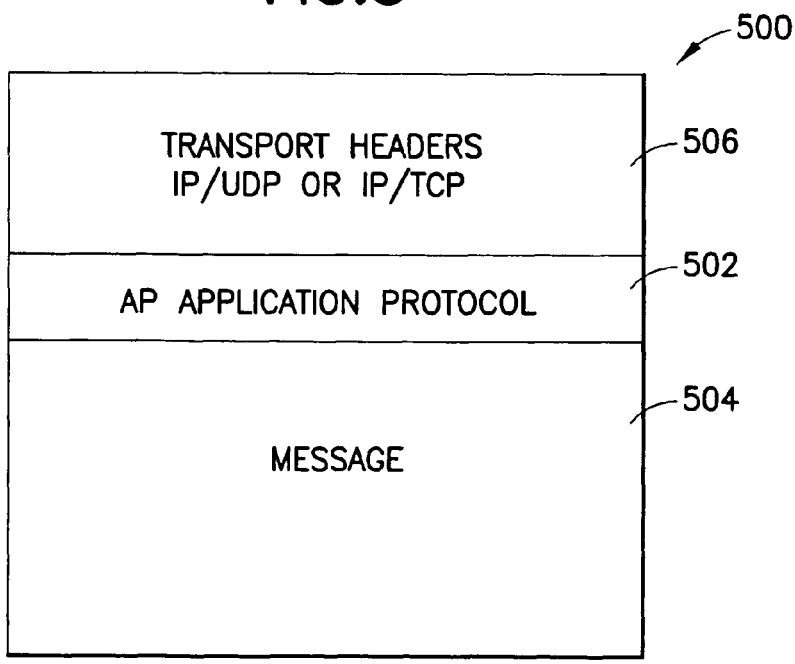
FIG. 5 illustrates a generic protocol header for an exemplary AP application protocol in accordance with various exemplary embodiments of the invention.

FIG. 5 illustrates a protocol header for an exemplary AP application protocol 500 (e.g., a message in accordance with the protocol 500) in accordance with various exemplary embodiments of the invention. The AP application protocol field 502 and message body 504 comprise new elements according to various exemplary embodiments of the invention. Note that the AP application protocol 500 may also include one or more transport headers 506, such as for IP/UDP or IP/TCP, as non-limiting examples.

As non-limiting examples, the AP configuration port advertisement can be of a connectionless type or of a connection-oriented type. The FSU profile delivery is generally connection-oriented. In both cases, and depending on the implementation of the particular exemplary embodiment in question, security may be applied between the source address and the destination address, if so defined. In such a case, the security association can be established (e.g., by IPSec). If IPSec is used, the security association should be established between the nodes before any application level messages are exchanged.

As utilized herein, a protocol generally may be considered a convention or standard that controls or enables the connection, communication, and data transfer between two endpoints. A protocol generally may be implemented by a method, program (e.g., a computer program stored or tangibly embodied on a computer-readable medium such as a memory, for example) or process specifying the operations in question and/or messages utilized.

SECTION 7: EXAMPLE FSU PROFILE PARAMETERS

The FSU profile may include zero or more parameters as illustrated above in FIG. 4. The following (labeled a-o) are presented as non-limiting examples of such parameters.

(a) AP disabled/AP enabled (b) AP operation tentatively barred [time]

(c) allowed bands; band [i, ii, iii, . . . , xii]

(d) default carrier parameters (e) safe band [center, frequency range]

The safe band is the part of the frequency spectrum in which the AP may initialize the connection and start operations. Different operators may have separate dedicated parts of the frequency (e.g., frequency band) and these frequency resources may change locally (e.g., according to traffic load, such as for busy hours). If the AP belongs to the operator, the AP may use the operator's dedicated part of the frequency band. For an AP that does not belong to the operator, there may not be any safe band or the possible safe band is given in a frequency portion the operator considers as having less interference risks for its network (e.g., a corner of the flexibly shared part of the frequency band).

(f) flexible band, if any [center, frequency range]

The flexible band is the part of the frequency band on the FSU spectrum where the operator allows the AP to expand its communication with the given power bounds (e.g., if interference conditions are bearable).

(g) max transmit power bounds [20] dBm (h) bandwidth bounds [10, 20, 40, 100, 200] MHz (i) nominal center frequencies allowed in a range [x to y] GHz (j) list of barred bandwidths at given center frequencies in the allowed band For example, Band viii, bw 20 MHz, {2.700, 2.720, 2.740, 2.760, 2.780, 3.20} GHz. As another example, Band xii, bw 100 MHz, 3.5 GHz.

(k) power scaling; current maximum reduced by [−3, −6, −9, −12, −15, −35] dB

As a non-limiting example, assuming 20 dBm maximum AP power attenuated by 35 dB will create −15 dBm transmit power, which is comparable to the tolerable adjacent channel leakage power of the eNB, which the operator network needs to be able to tolerate regardless.

(l) mandated frame synchronization (m) frame synchronization reference (n) name, type, value and offset of the time reference (o) mandated DTX parameters (as idle frame) for interference management (this allows clean interference measurements on the band)

SECTION 8: VARIOUS EXEMPLARY DEVICES

Figure 6:
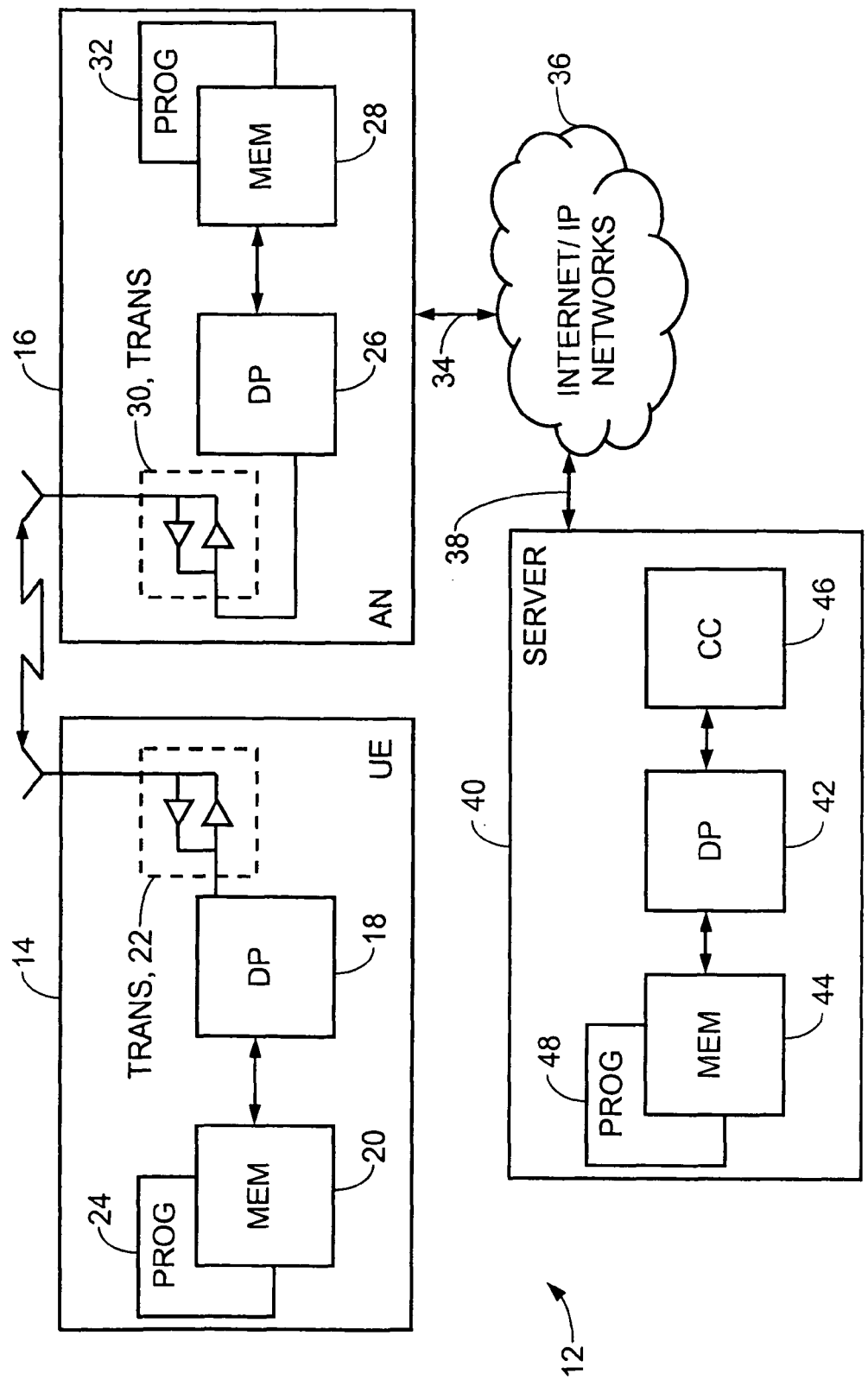
FIG. 6 shows a simplified block diagram of various electronic devices that are suitable for use in practicing the exemplary embodiments of this invention.

Reference is made to FIG. 6 for illustrating a simplified block diagram of various electronic devices that are suitable for use in practicing the exemplary embodiments of this invention. In FIG. 6, a wireless network 12 is adapted for communication with a user equipment (UE) 14 via an access node (AN) 16. The UE 14 includes a data processor (DP) 18, a memory (MEM) 20 coupled to the DP 18, and a suitable RF transceiver (TRANS) 22 (having a transmitter (TX) and a receiver (RX)) coupled to the DP 18. The MEM 20 stores a program (PROG) 24. The TRANS 22 is for bidirectional wireless communications with the AN 16. Note that the TRANS 22 has or is connected to at least one antenna to facilitate communication.

The AN 16 includes a data processor (DP) 26, a memory (MEM) 28 coupled to the DP 26, and a suitable RF transceiver (TRANS) 30 (having a transmitter (TX) and a receiver (RX)) coupled to the DP 26. The MEM 28 stores a program (PROG) 32. The TRANS 30 is for bidirectional wireless communications with the UE 14 (and other UEs). Note that the TRANS 30 has or is connected to at least one antenna to facilitate communication. The AN 16 is coupled via a data path 34 to zero or more external networks- or systems, such as the internet and/or other IP networks 36, for example.

The AN 16 is configured to communicate with a server node (server) 40 via data paths 34, 38 and zero or more other networks or systems, such as the internet/IP networks 36. The server 40 includes a data processor (DP) 42, a memory (MEM) 44 coupled to the DP 42, and a suitable communication component (CC) 46 configured to enable bilateral communication with other devices and/or networks. The MEM 44 stores a program (PROG) 48. In accordance with various exemplary embodiments of the invention, the server 40 is configured to receive a configuration port advertisement from the AN 16 and to send flexible usage information (e.g., a FSU profile) to the AN 16. These communications may occur via the data paths 34, 38 and the internet/IP networks 36, as non-limiting examples. As a non-limiting example, the server 40 may comprise an O&M server or an O&M server node. As a non-limiting example, the CC 46 may comprise a transceiver or a wireless transceiver.

At least one of the DPs 18, 26, 42 of the UE 14, the AN 16 and/or the server 40 is configured to generate and/or read (e.g., interpret) at least one of the messages described herein. As a non-limiting example, the DP 26 of the AN 16 may be configured to generate the configuration port advertisement and/or to read/interpret the flexible usage information (e.g., a FSU profile) received from the server 40. As another non-limiting example, the DP 42 of the server 40 may be configured to read/interpret the configuration port advertisement received from the AN 16 and/or to generate the flexible usage information (e.g., a FSU profile). In some exemplary embodiments, one or both of the configuration port advertisement and the flexible usage information (e.g., a FSU profile) is generated in advance (e.g., in advance of the server 40 receiving the configuration port advertisement) and/or one or both of the configuration port advertisement and the flexible usage information (e.g., a FSU profile) is stored on a computer-readable medium (e.g., MEM 28 and/or MEM 44).

At least one of the PROGs 24, 32, 48 is assumed to include program instructions that, when executed by the associated DP, enable the respective electronic device(s) to operate in accordance with the exemplary embodiments of this invention, as discussed herein.

In general, the various exemplary embodiments of the UE 14 can include, but are not limited to, mobile terminals, mobile phones, cellular phones, personal digital assistants (PDAs) having wireless communication capabilities, portable computers having wireless communication capabilities, image capture devices such as digital cameras having wireless communication capabilities, gaming devices having wireless communication capabilities, multimedia devices, music storage and playback appliances having wireless communication capabilities, Internet appliances permitting wireless Internet access and browsing, as well as portable units or terminals that incorporate combinations of such functions.

In general, the various exemplary embodiments of the AN 16 can include, but are not limited to, LAN ANs, WLAN ANs, cellular communication ANs, eNBs, Node Bs, relay nodes, mobile nodes, and stationary nodes, as well as units or nodes that incorporate combinations of such functions. In some exemplary embodiments, the wireless network 12 may comprise one or more relay nodes (e.g., UEs acting as relay nodes).

The embodiments of this invention may be implemented by computer software executable by one or more of the DPs 18, 26, 42 of the UE 14, the AN 16 and/or the server 40, or by hardware, or by a combination of software and hardware.

The MEMs 20, 28, 44 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 18, 26, 42 may be of any type suitable to the local technical environment, and may include one or more of general purpose computers, special purpose computers, microprocessors, digital signal processors (DSPs) and processors based on a multi-core processor architecture, as non-limiting examples.

While described above in reference to memories (MEMS 20, 28, 44), these components may generally be seen to correspond to storage devices, storage circuits, storage components and/or storage blocks. In some exemplary embodiments, these components may comprise one or more computer-readable mediums, one or more computer-readable memories and/or one or more program storage devices.

While described above in reference to data processors (DPs 18, 26, 42), these components may generally be seen to correspond to processors, processing devices, processing components, processing blocks, circuits, circuit devices, circuit components, circuit blocks, integrated circuits and/or chips (e.g., chips comprising one or more circuits or integrated circuits).

SECTION 9: FURTHER EXEMPLARY EMBODIMENTS

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

Figure 7:
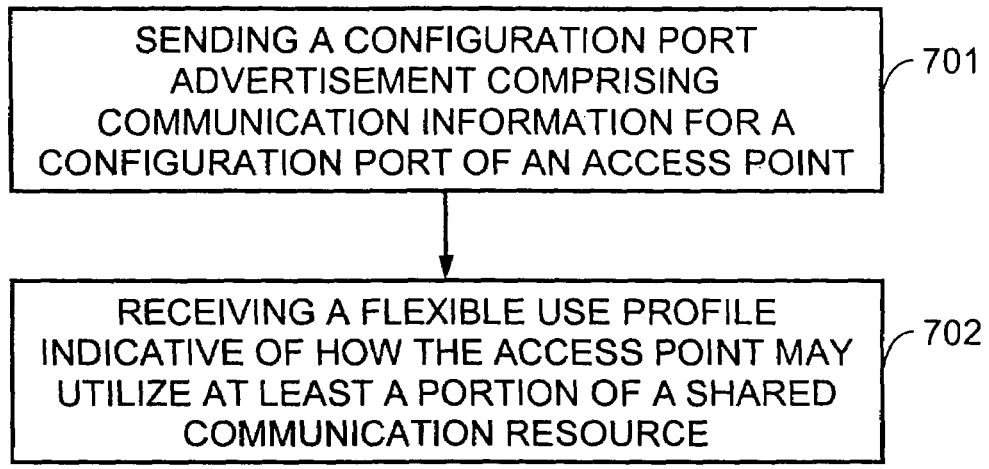
FIG. 7 depicts a flowchart illustrating one non-limiting example of a method for practicing the exemplary embodiments of this invention.

(1) In one non-limiting, exemplary embodiment, and as illustrated in FIG. 7, a method (e.g., a computer-implemented method) comprising: sending a configuration port advertisement comprising communication information for a configuration port of an access point (701); and receiving a flexible use profile indicative of how the access point may utilize at least a portion of a shared communication resource (702).

A method as above, where the method is implemented as a communication protocol by the access point and/or a server management node. A method as in any above, where the shared communication resource is at least used for communication between at least the access point and a user equipment. A method as in any above, where the shared communication resource is used for communication between the access point and a user equipment. A method as in any above, where at least a portion of the shared communication resource is used for communication between the access point (e.g., a base station, a Node B, an eNB) and an apparatus (e.g., a user equipment, a mobile device, a mobile phone). A method as in any above, further comprising one or more additional aspects of the exemplary embodiments of the invention as described herein.

(2) In another non-limiting, exemplary embodiment, a program storage device readable by a machine, tangibly embodying a program of instructions executable by the machine for performing operations, said operations comprising: sending a configuration port advertisement comprising communication information for a configuration port of an access point (701); and receiving a flexible use profile indicative of how the access point may utilize at least a portion of a shared communication resource (702).

A program storage device as in any above, further comprising one or more additional aspects of the exemplary embodiments of the invention as described herein.

(3) In another non-limiting, exemplary embodiment, an apparatus comprising: a transmitter configured to send a configuration port advertisement comprising communication information for a configuration port of an access point; and a receiver configured to receive a flexible use profile indicative of how the access point may utilize at least a portion of a shared communication resource.

An apparatus as in any above, further comprising one or more additional aspects of the exemplary embodiments of the invention as described herein.

(4) In another non-limiting, exemplary embodiment, an apparatus comprising: means for sending a configuration port advertisement comprising communication information for a configuration port of an access point; and means for receiving a flexible use profile indicative of how the access point may utilize at least a portion of a shared communication resource.

An apparatus as in any above, where the means for sending comprises a transmitter and the means for receiving comprises a receiver. An apparatus as in any above, further comprising one or more additional aspects of the exemplary embodiments of the invention as described herein.

(5) In another non-limiting, exemplary embodiment, an apparatus comprising:

transmitter circuitry configured to send a configuration port advertisement comprising communication information for a configuration port of an access point; and receiver circuitry configured to receive a flexible use profile indicative of how the access point may utilize at least a portion of a shared communication resource.

An apparatus as in any above, further comprising one or more additional aspects of the exemplary embodiments of the invention as described herein.

Figure 8:
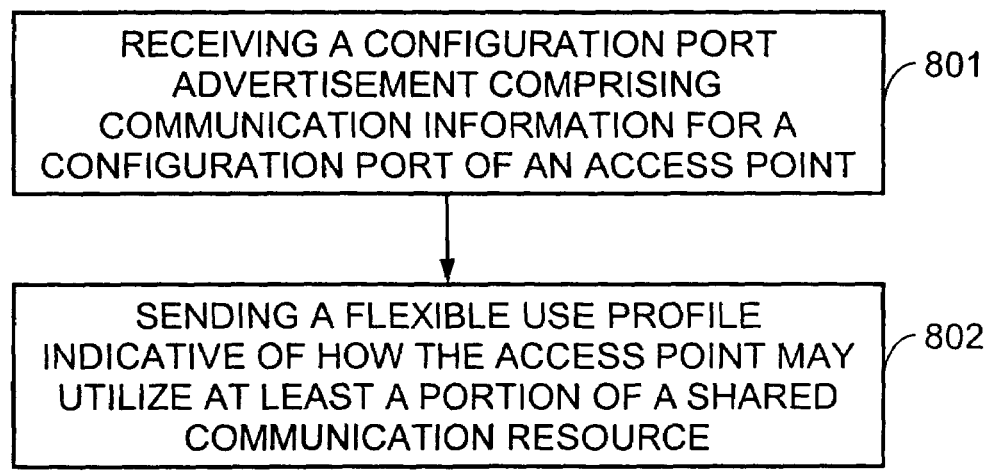
FIG. 8 depicts a flowchart illustrating another non-limiting example of a method for practicing the exemplary embodiments of this invention.

(6) In another non-limiting, exemplary embodiment, and as illustrated in FIG. 8, a method (e.g., a computer-implemented method) comprising: receiving a configuration port advertisement comprising communication information for a configuration port of an access point (801); and sending a flexible use profile indicative of how the access point may utilize at least a portion of a shared communication resource (802).

A method as above, where the method is implemented as a communication protocol by the access point and/or a server management node. A method as in any above, where the shared communication resource is at least used for communication between at least the access point and a user equipment. A method as in any above, where the shared communication resource is used for communication between the access point and a user equipment. A method as in any above, where at least a portion of the shared communication resource is used for communication between the access point (e.g., a base station, a Node B, an eNB) and an apparatus (e.g., a user equipment, a mobile device, a mobile phone). A method as in any above, further comprising one or more additional aspects of the exemplary embodiments of the invention as described herein.

(7) In another non-limiting, exemplary embodiment, a program storage device readable by a machine, tangibly embodying a program of instructions executable by tile machine for performing operations, said operations comprising: receiving a configuration port advertisement comprising communication information for a configuration port of an access point (801); and sending a flexible use profile indicative of how the access point may utilize at least a portion of a shared communication resource (802).

A program storage device as in any above, further comprising one or more additional aspects of the exemplary embodiments of the invention as described herein.

(8) In another non-limiting, exemplary embodiment, an apparatus comprising: a receiver configured to receive a configuration port advertisement comprising communication information for a configuration port of an access point; and a transmitter configured to transmit a flexible use profile indicative of how the access point may utilize at least a portion of a shared communication resource.

An apparatus as in any above, further comprising one or more additional aspects of the exemplary embodiments of the invention as described herein.

(9) In another non-limiting, exemplary embodiment, an apparatus comprising: means for receiving a configuration port advertisement comprising communication information for a configuration port of an access point; and means for sending a flexible use profile indicative of how the access point may utilize at least a portion of a shared communication resource.

An apparatus as in any above, where the means for sending comprises a transmitter and the means for receiving comprises a receiver. An apparatus as in any above, further comprising one or more additional aspects of the exemplary embodiments of the invention as described herein.

(10) In another non-limiting, exemplary embodiment, an apparatus comprising: receiver circuitry configured to receive a configuration port advertisement comprising communication information for a configuration port of an access point; and transmitter circuitry configured to transmit a flexible use profile indicative of how the access point may utilize at least a portion of a shared communication resource.

An apparatus as in any-above, further comprising one or more additional aspects of the exemplary embodiments of the invention as described herein.

(11) In another non-limiting, exemplary embodiment, a program storage device readable by a machine, tangibly embodying a data structure representative of a configuration port advertisement, wherein the configuration port advertisement comprises communication information for a configuration port of an access point, wherein the configuration port advertisement is configured for use by an operator in determining how the access point may utilize at least a portion of a shared communication resource.

A program storage device as in any above, further comprising one or more additional aspects of the exemplary embodiments of the invention as described herein.

(12) In another non-limiting, exemplary embodiment, a program storage device readable by a machine, tangibly embodying a data structure representative of a flexible use profile, wherein the flexible use profile is indicative of how an access point may utilize at least a portion of a shared communication resource, wherein the flexible use profile is transmitted towards the access point in response to receiving a configuration port advertisement comprising communication information for a configuration port of the access point.

A program storage device as in any above, further comprising one or more additional aspects of the exemplary embodiments of the invention as described herein.

(13) In another non-limiting, exemplary embodiment, a system comprising: a first device comprising a first transmitter and a first receiver, wherein the first transmitter is configured to send a configuration port advertisement comprising communication information for a configuration port of an access point, wherein the first receiver is configured to receive a flexible use profile indicative of how the access point may utilize at least a portion of a shared communication resource; and a second device comprising a second transmitter and a second receiver, wherein the second receiver is configured to receive the configuration port advertisement, wherein the second transmitter is configured to transmit the flexible use profile.

An system as in any above, further comprising one or more additional aspects of the exemplary embodiments of the invention as described herein.

(14) In another non-limiting, exemplary embodiment, a mobile terminal comprising: a data processor and a transceiver configured to communicate with an access point of a network, wherein the mobile terminal is configured to operate in a flexible usage arrangement and to receive information indicative of a flexible usage parameterization of the access point. The mobile terminal as in the previous, wherein the flexible usage parameterization of the access point is dictated by a server node.

A mobile terminal as in any above, further comprising one or more additional aspects of the exemplary embodiments of the invention as described herein.

Figure 9:
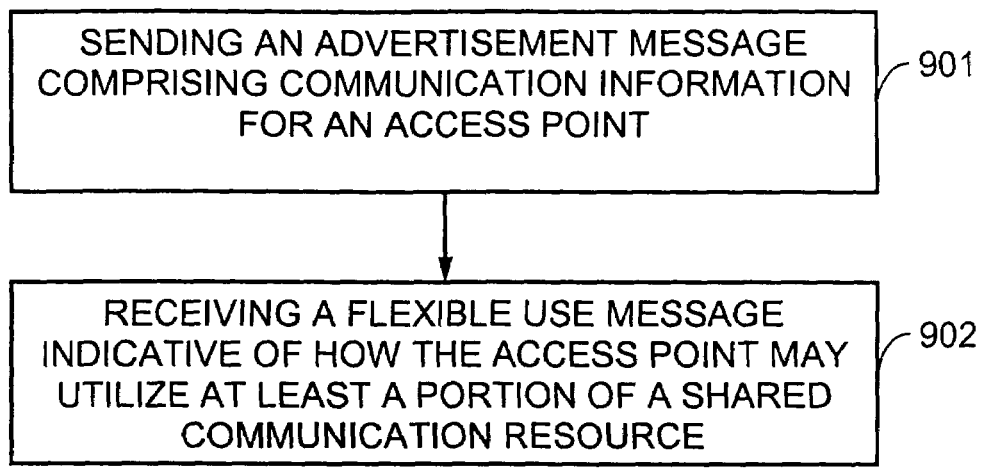
FIG. 9 depicts a flowchart illustrating still another non-limiting example of a method for practicing the exemplary embodiments of this invention.

(15) In another non-limiting, exemplary embodiment, and as illustrated in FIG. 9, a method (e.g., a computer-implemented method) comprising: sending an advertisement message comprising communication information for an access point (901); and receiving a flexible use message indicative of how the access point may utilize at least a portion of a shared communication resource (902).

A method as above, where the method is implemented as a communication protocol by the access point and/or a server management node. A method as in any above, where the advertisement message comprises a configuration port advertisement and the communication information comprises communication information for a configuration port of the access point. A method as in any above, where the flexible use message comprises a flexible spectrum use profile having at least one flexible spectrum use parameter type and at least one corresponding flexible spectrum use parameter value. A method as in any above, where the method is implemented as a communication protocol by the access point. A method as in any above, where the shared communication resource comprises a radio frequency spectrum shared amongst a plurality of operators.

A method as in any above, where the shared communication resource is at least used for communication between at least the access point and a user equipment. A method as in many above, where the shared communication resource is used for communication between the access point and a user equipment. A method as in any above, where at least a portion of the shared communication resource is used for communication between the access point (e.g., a base station, a Node B, an eNB) and an apparatus (e.g., a user equipment, a mobile device, a mobile phone). A method as in any above, further comprising one or more additional aspects of the exemplary embodiments of the invention as described herein.

(16) In another non-limiting, exemplary embodiment, a program storage device readable by a machine, tangibly embodying a program of instructions executable by the machine for performing operations, said operations comprising: sending an advertisement message comprising communication information for an access point (901); and receiving a flexible use message indicative of how the access point may utilize at least a portion of a shared communication resource (902).

A program storage device as in any above, further comprising one or more additional aspects of the exemplary embodiments of the invention as described herein.

(17) In another non-limiting, exemplary embodiment, an apparatus comprising: a transmitter configured to send an advertisement message comprising communication information for an access point; and a receiver configured to receive a flexible use message indicative of how the access point may utilize at least a portion of a shared communication resource.

An apparatus as in any above, where the advertisement message comprises a configuration port advertisement and the communication information comprises communication information for a configuration port of the access point. An apparatus as in any above, where the flexible use message comprises a flexible spectrum use profile having at least one flexible spectrum use parameter type and at least one corresponding flexible spectrum use parameter value. An apparatus as in any above, where the method is implemented as a communication protocol by the access point. An apparatus as in any above, where the shared communication resource comprises a radio frequency spectrum shared amongst a plurality of operators. An apparatus as in any above, where the apparatus comprises an access node. An apparatus as in any above, where the apparatus comprises a base station or an eNB.

An apparatus as in any above, where the shared communication resource is at least used for communication between at least the access point and a user equipment. An apparatus as in any above, where the shared communication resource is used for communication between the access point and a user equipment. An apparatus as in any above, where at least a portion of the shared communication resource is used for communication between the access point (e.g., a base station, a Node B, an eNB) and another apparatus (e.g., a user equipment, a mobile device, a mobile phone). An apparatus as in any above, further comprising one or more additional aspects of the exemplary embodiments of the invention as described herein.

(18) In another non-limiting, exemplary embodiment, an apparatus comprising: means for sending an advertisement message comprising communication information for an access point; and means for receiving a flexible use message indicative of how the access point may utilize at least a portion of a shared communication resource.

An apparatus as in any above, where the means for sending comprises a transmitter and the means for receiving comprises a receiver. An apparatus as in any above, further comprising one or more additional aspects of the exemplary embodiments of the invention as described herein.

(19) In another non-limiting, exemplary embodiment, an apparatus comprising: transmitter circuitry configured to send an advertisement message comprising communication information for an access point; and receiver circuitry configured to receive a flexible use message indicative of how the access point may utilize at least a portion of a shared communication resource.

An apparatus as in any above, further comprising one or more additional aspects of the exemplary embodiments of the invention as described herein.

Figure 10:
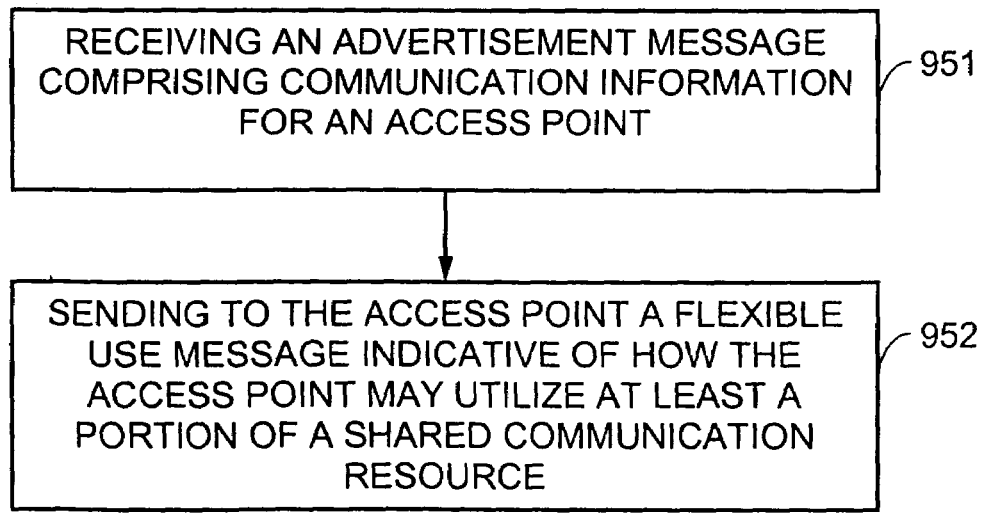
FIG. 10 depicts a flowchart illustrating yet another non-limiting example of a method for practicing the exemplary embodiments of this invention.

(20) In another non-limiting, exemplary embodiment, and as illustrated in FIG. 10, a method (e.g., a computer-implemented method) comprising: receiving an advertisement message comprising communication information for an access point (951); and sending to the access point a flexible use message indicative of how the access point may utilize at least a portion of a shared communication resource (952).

A method as above, where the method is implemented as a communication protocol by the access point and/or a server management node. A method as in any above, where the advertisement message comprises a configuration port advertisement and the communication information comprises communication information for a configuration port of the access point. A method as in any above, where the flexible use message comprises a flexible spectrum use profile having at least one flexible spectrum use parameter type and at least one corresponding flexible spectrum use parameter value. A method as in any above, where the method is implemented as a communication protocol by the access point. A method as in any above, where the shared communication resource comprises a radio frequency spectrum shared amongst a plurality of operators.

A method as in any above, where the shared communication resource is at least used for communication between at least the access point and a user equipment. A method as in any above, where the shared communication resource is used for communication between the access point and a user equipment. A method as in any above, where at least a portion of the shared communication resource is used for communication between the access point (e.g., a base station, a Node B, an eNB) and an apparatus (e.g., a user equipment, a mobile device, a mobile phone). A method as in any above, further comprising one or more additional aspects of the exemplary embodiments of the invention as described herein.

(21) In another non-limiting, exemplary embodiment, a program storage device readable by a machine, tangibly embodying a program of instructions executable by the machine for performing operations, said operations comprising: receiving an advertisement message comprising communication information for an access point (951); and sending to the access point a flexible use message indicative of how the access point may utilize at least a portion of a shared communication resource (952).

A program storage device as in any above, further comprising one or more additional aspects of the exemplary embodiments of the invention as described herein.

(22) In another non-limiting, exemplary embodiment, an apparatus comprising: a receiver configured to receive an advertisement message comprising communication information for an access point; and a transmitter configured to transmit to the access point a flexible use message indicative of how the access point may utilize at least a portion of a shared communication resource.

An apparatus as in any above, where the advertisement message comprises a configuration port advertisement and the communication information comprises communication information for a configuration port of the access point. An apparatus as in any above, where the flexible use message comprises a flexible spectrum use profile having at least one flexible spectrum use parameter type and at least one corresponding flexible spectrum use parameter value. An apparatus as in any above, where the method is implemented as a communication protocol by a server management node. An apparatus as in any above, where the shared communication resource comprises a radio frequency spectrum shared amongst a plurality of operators. An apparatus as in any above, where the apparatus comprises a server management node.

An apparatus as in any above, where the shared communication resource is at least used for communication between at least the access point and a user equipment. An apparatus as in any above, where the shared communication resource is used for communication between the access point and a user equipment. An apparatus as in any above, where at least a portion of the shared communication resource is used for communication between the access point (e.g., a base station, a Node B, an eNB) and another apparatus (e.g., a user equipment, a mobile device, a mobile phone). An apparatus as in any above, further comprising one or more additional aspects of the exemplary embodiments of the invention as described herein. An apparatus as in any above, further comprising one or more additional aspects of the exemplary embodiments of the invention as described herein.

(23) In another non-limiting, exemplary embodiment, an apparatus comprising: means for receiving an advertisement message comprising communication information for an access point; and means for sending to the access point a flexible use message indicative of how the access point may utilize at least a portion of a shared communication resource.

An apparatus as in any above, where the means for sending comprises a transmitter and the means for receiving comprises a receiver. An apparatus as in any above, further comprising one or more additional aspects of the exemplary embodiments of the invention as described herein.

(24) In another non-limiting, exemplary embodiment, an apparatus comprising: receiver circuitry configured to receive an advertisement message comprising communication information for an access point; and transmitter circuitry configured to transmit to the access point a flexible use message indicative of how the access point may utilize at least a portion of a shared communication resource.

An apparatus as in any above, further comprising one or more additional aspects of the exemplary embodiments of the invention as described herein.

(25) In another non-limiting, exemplary embodiment, a program storage device readable by a machine, tangibly embodying a data structure representative of an advertisement message, wherein the advertisement message comprises communication information for an access point, wherein the advertisement message is configured for use by an operator to specify how the access point may utilize at least a portion of a shared communication resource.

A program storage device as in any above, further comprising one or more additional aspects of the exemplary embodiments of the invention as described herein.

(26) In another non-limiting, exemplary embodiment, a program storage device readable by a machine, tangibly embodying a data structure representative of a flexible use message, wherein the flexible use message is indicative of how an access point may utilize at least a portion of a shared communication resource, wherein the flexible use message is transmitted towards the access point by an operator in response to the operator receiving an advertisement message comprising communication information for the access point.

A program storage device as in any above, further comprising one or more additional aspects of the exemplary embodiments of the invention as described herein.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device (e.g., a computer-readable medium, a memory) readable by a machine (e.g., a computer, a mobile station, a mobile device, a mobile node), tangibly embodying a program of instructions (e.g., a program, a computer program) executable by the machine for performing operations. The operations comprise steps of utilizing the exemplary embodiments or steps of the method.

Still further, the various names used for the messages (e.g., configuration port advertisement, flexible use profile) are not intended to be limiting in any respect, as these messages, and the information contained therein, may be identified by any suitable names.

The blocks depicted in FIGS. 7-10 may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 7-10 should be considered merely exemplary and non-limiting. It should be appreciated that the blocks depicted in FIGS. 7-10 may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 7-10 so as to implement one or more further exemplary embodiments of the invention, such as those described in further detail herein.

That is, the non-limiting, exemplary embodiments of the invention shown in FIGS. 7-10 may be implemented, practiced or utilized in conjunction with one or more further aspects in any combination (e.g., any combination that is practicable, suitable and/or feasible) and are not limited only to the blocks, steps, functions and/or operations illustrated in FIGS. 7-10.

While the exemplary embodiments have been described above in the context of FSU, it should be appreciated that the exemplary embodiments of this invention are not limited for use with only this one particular type of wireless communication system, and that they may be used to advantage in other wireless communication systems. As a non-limiting example, the exemplary embodiments of the invention may be utilized in conjunction with any type of shared communication resource (e.g., time) between a first network (e.g., the operator) and a second network (e.g., a local network such as a local WLAN).

It should be noted that the terms connected, "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
a processor; and
a memory including computer program instructions, the memory and the computer program instructions being configured, with the processor, to cause the apparatus at least to perform:
sending a configuration port advertisement message via a first wireless communication to a local area network coupled to an operation and maintenance (O&M) server via the Internet, said configuration port advertisement message comprising communication information for a configuration port of the apparatus, the communication information including at least a configuration header, an internet protocol address, a configuration port number, and a security parameter, said configuration port being where the apparatus is willing to receive information on flexible spectrum use from the O&M server;
exchanging authentication and security information with said O&M server prior to receipt of said information on flexible spectrum use; and
receiving from said O&M server, at the configuration port via a second wireless communication in response to said first wireless communication, a flexible spectrum use message indicative of how the apparatus may utilize at least a portion of a shared communication resource,
wherein the apparatus comprises an access point, and
wherein the flexible spectrum use message carries a flexible spectrum use profile, which includes at least a controlling node internet protocol address, a controlling node port number, a flexible spectrum use parameter class, a security parameter, a spectrum use parameter type, and a spectrum use parameter value.

2. An apparatus as in claim 1, where the flexible spectrum use message comprises a flexible spectrum use profile having at least one flexible spectrum use parameter type and at least one corresponding flexible spectrum use parameter value.

3. An apparatus as in claim 1, where the shared communication resource comprises a radio frequency spectrum shared amongst a plurality of operators.

4. An apparatus as in claim 1, where the configuration port advertisement message is sent from the apparatus to a configuration management server and where the configuration port advertisement message indicates to the configuration management server that the apparatus exists and is not directly under operational control by the configuration management server.

5. An apparatus as in claim 1, where the received flexible spectrum use message specifies that no operation by the apparatus is allowed and where the received flexible spectrum use message triggers the apparatus to be non-operational at least for the shared communication resource.

6. An apparatus as in claim 1, where the flexible spectrum use message comprises a flexible spectrum use profile that defines bounds of operation for the apparatus within the shared communication resource.

7. An apparatus as in claim 1, where the configuration port advertisement message comprises a configuration header, an internet protocol address and a configuration port number, where the configuration header identifies the configuration port advertisement message as an access point configuration port advertisement message, where the internet protocol address is for the access point, where the configuration port number is for the configuration port of the access point.

8. An apparatus as in claim 1, where the configuration port advertisement message comprises a transport header for internet protocol/transmission control protocol (IP/TCP).

9. An apparatus as in claim 1, where the flexible spectrum use message comprises a transport header for internet protocol/transmission control protocol (IP/TCP).

10. A method comprising:
sending a configuration port advertisement message from an apparatus via a first wireless communication to a local area network coupled to an operation and maintenance (O&M) server via the Internet, said configuration port advertisement message comprising communication information for a configuration port of the apparatus, the communication information including at least a configuration header, an internet protocol address, a configuration port number, and a security parameter, said configuration port being where the apparatus is willing to receive information on flexible spectrum use from the O&M server;

exchanging authentication and security information between said apparatus and said O&M server prior to receipt of said information on flexible spectrum use; and receiving from said O&M server, at the configuration port of the apparatus via a second wireless communication in response to said first wireless message communication, a flexible spectrum use message indicative of how the apparatus may utilize at least a portion of a shared communication resource, wherein the flexible spectrum use message carries a flexible spectrum use profile, which includes at least a controlling node internet protocol address, a controlling node port number, a flexible spectrum use parameter class, a security parameter, a spectrum use parameter type, and a spectrum use parameter value.

11. A method as in claim 10, where the method is implemented as a communication protocol by the access point.

12. A method as in claim 10, where the shared communication resource comprises a radio frequency spectrum shared amongst a plurality of operators.

13. A non-transitory program storage device readable by a machine, tangibly embodying a program of instructions, where execution of the program of instructions by the machine results in operations comprising the steps of the method of claim 10.

14. An apparatus comprising:
a processor; and
a memory including computer program instructions, the memory and the computer program instructions being configured, with the processor, to cause the apparatus at least to perform:
receiving, via a first wireless communication from an access point, said access point being connected to a local area network coupled to said apparatus via the Internet, a configuration port advertisement message comprising communication information for a configuration port of said access point, the communication information including at least a configuration header, an internet protocol address, a configuration port number, and a security parameter, said configuration port being where the access point is willing to receive information on flexible spectrum use from said apparatus;
exchanging authentication and security information with said access point prior to sending said information on flexible spectrum use; and
sending by said apparatus, via a second wireless communication in response to said first wireless communication, a flexible spectrum use message to the configuration port of the access point, said flexible spectrum use message being indicative of how the access point may utilize at least a portion of a shared communication resource,
wherein the apparatus comprises an operation and maintenance (O&M) server, and wherein the flexible spectrum use message carries a flexible spectrum use profile, which includes at least a controlling node internet protocol address, a controlling node port number, a flexible spectrum use parameter class, a security parameter, a spectrum use parameter type, and a spectrum use parameter value.

15. An apparatus as in claim 14, where the flexible spectrum use message comprises a flexible spectrum use profile having at least one flexible spectrum use parameter type and at least one corresponding flexible spectrum use parameter value.

16. An apparatus as in claim 14, where the apparatus comprises a server management node.

17. An apparatus as in claim 14, where the shared communication resource comprises a radio frequency spectrum shared amongst a plurality of operators.

18. A method comprising:
receiving, by an apparatus via a first wireless communication from an access point, said access point being connected to a local area network coupled to said apparatus via the Internet, a configuration port advertisement message comprising communication information for a configuration port of said access point, the communication information including at least a configuration header, an internet protocol address, a configuration port number, and a security parameter, said configuration port being where the access point is willing to receive information on flexible spectrum use from said apparatus;
exchanging authentication and security information between said access point and said apparatus prior to sending said information on flexible spectrum use; and
sending by said apparatus, via a second wireless communication in response to said first wireless communication, a flexible spectrum use message from the apparatus to the configuration port of the access point, said flexible spectrum use message being indicative of how the access point may utilize at least a portion of a shared communication resource,
wherein the flexible spectrum use message carries a flexible spectrum use profile, which includes at least a controlling node internet protocol address, a controlling node port number, a flexible spectrum use parameter class, a security parameter, a spectrum use parameter type, and a spectrum use parameter value.

19. A method as in claim 18, where the method is implemented as a communication protocol by a server management node.

20. A non-transitory program storage device readable by a machine, tangibly embodying a program of instructions, where execution of the program of instructions by the machine results in operations comprising the steps of the method of claim 18.

* * * * *